June 8, 1965 A. C. MASON ETAL 3,187,574
OPTICAL PYROMETER
Filed Jan. 3, 1963
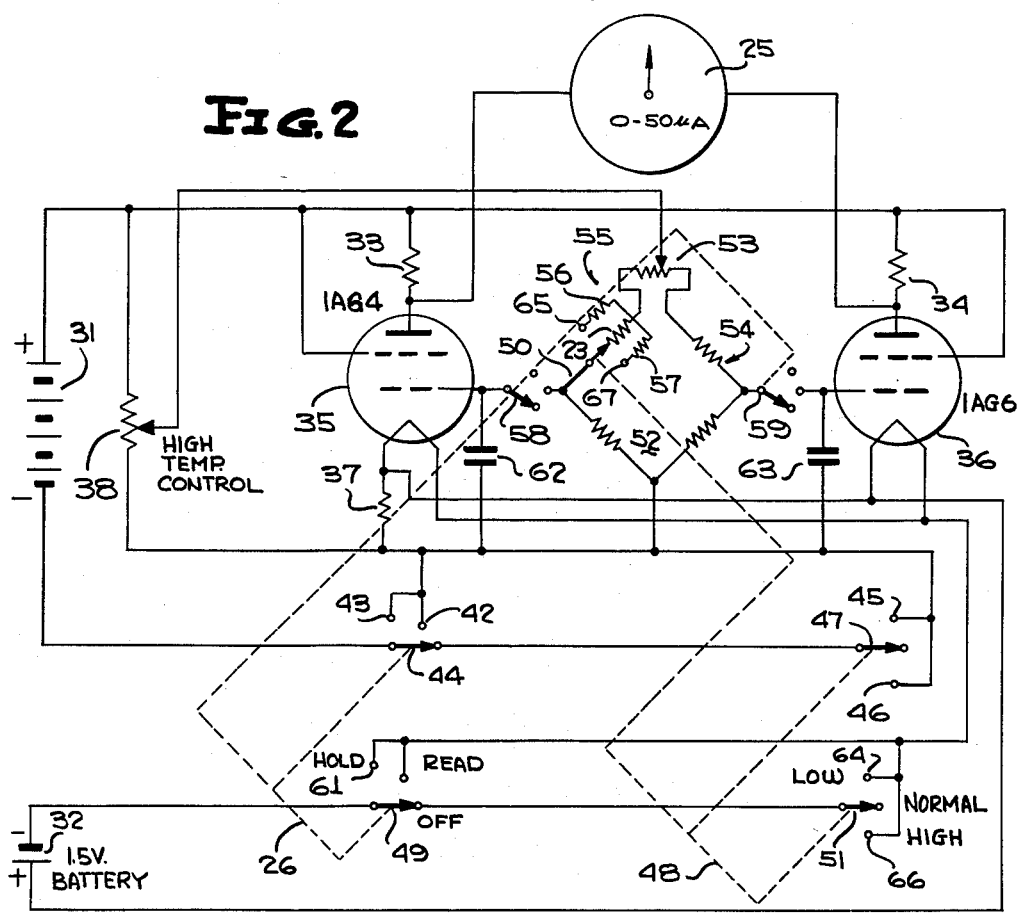
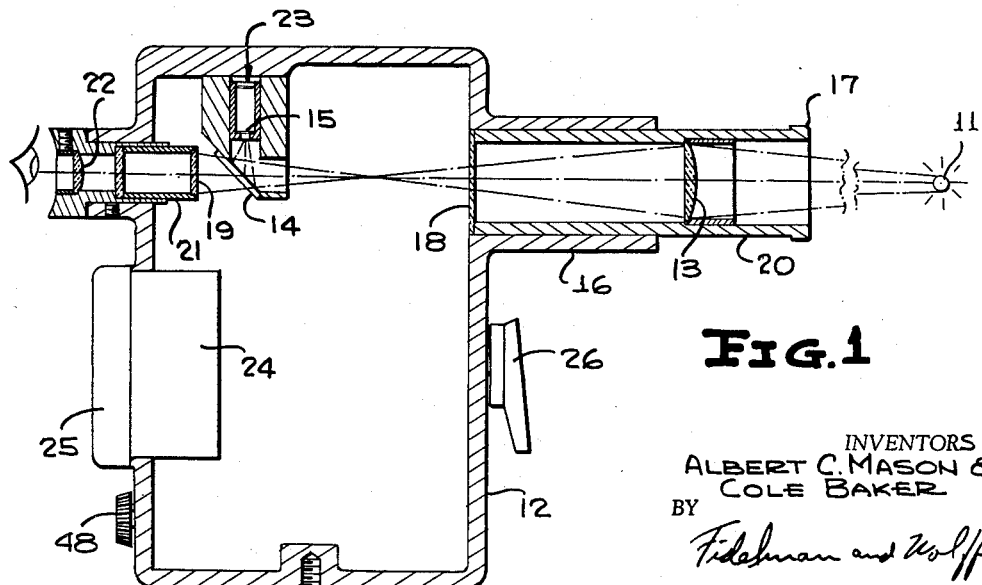
INVENTORS
ALBERT C. MASON &
COLE BAKER
BY
Fishman and Wolffe
ATTORNEYS

United States Patent Office 3,187,574
Patented June 8, 1965

3,187,574
OPTICAL PYROMETER
Albert C. Mason, Larchmont, N.Y., and Cole Baker, Riverside, Conn., assignors to Pyrotel Corp., Mamaroneck, N.Y., a corporation of New York
Filed Jan. 3, 1963, Ser. No. 249,299
12 Claims. (Cl. 73—355)

The present invention relates generally to a portable, infrared radiation pyrometer and more particularly to a portable pyrometer having both low and high temperature calibrating features, optical focusing abilities, and a meter which may be read subsequent to a sighting even though the pyrometer is no longer aimed at the source.

The need presently exists for a portable, optical pyrometer which is capable of accurately ascertaining the temperature of high temperature equipment, for example cupolas, crucibles, kilns, ovens. In order to obtain accurate temperature readings of such high temperature bodies, it is usually necessary for personnel making the measurements to be located at a substantial distance from the source. The commercially available pyrometers with which we are familiar are generally not sufficiently portable to obtain temperature readings from the many different positions for which measurements of the foregoing equipment must be made. Nor do they provide sufficiently accurate indications because the heat source is frequently not sharply focused on the optical or infrared radiation detector. In addition, defocusing frequently results from movement of the detector by the operator when he is reading the instrument, at a time subsequent to his positioning of the pyrometer. Reading variations also arise because of subjective influences on different observers.

In the present invention, accurate temperature readings are attained by optically focusing an objective lens on the heat source being measured. The eye of the operator making the adjustment is positioned the same optical distance from the image of the source as the detector. This is accomplished by a beam splitting device which couples only the light energy from the source to the eye of the operator and reflects the infrared energy to the detector. The eye of the operator is protected from the deleterious effects associated with infrared energy and the detector does not produce erroneous signals because of light, rather than heat energy, impinging thereon. To insure this result, the beam splitting element is coated with a reflective material that is transparent to the short wave length infrared rays but which reflects the longer wave length infrared rays to the detector.

The detector is connected in a normally balanced Wheatstone bridge having one pair of its diagonals connected via a differential amplifier to a low impedance meter. The differential amplifier senses any unbalance existing in the Wheatstone bridge when the detector is subjected to energy from the heat source being measured to provide an accurate voltage indication of the source temperature.

To enable the operator to determine the temperature of the heat source subsequent to a sighting, an electronic storage circuit is employed for maintaining the inputs to the differential amplifier at the same voltage level that existed during a measurement, despite defocusing of the heat source from the pyrometer detector, or removal from target. The storage circuit includes a separate capacitor, preferably connected to each input of the differential amplifier. With the storage circuit in use, the diagonals of the bridge are disconnected from the input terminals of the differential amplifier when a reading is being made so that the capacitors and amplifier inputs are maintained at substantially the same voltages as when the heat source is focused on the detector during a measurement.

I have found that the common photoelectric detectors may not be considered as having linear characteristics from the low to the high temperature extremes and differ in response from unit to unit. In consequence, an accurate system must provide calibration in both regions. In the present invention, this is effected by simulating low or ambient temperature conditions by a first resistor and high temperature conditions with a further resistance. For low temperature calibration, with the first resistor replacing the photocell in the bridge, a potentiometer, connected in the input circuit of the Wheatstone bridge, is adjusted until an impedance balance is achieved and null reading is observed on the low impedance meter. The high temperature calibration is effected by substituting the high temperature simulating resistance for the photodetector and adjusting the energizing potential for the Wheatstone bridge until the meter reads full scale.

Accordingly, it is an object of the present invention to provide a new and improved portable, optical, infrared radiation pyrometer.

It is another object of the present invention to provide an optical pyrometer in which the operator can easily focus the detector onto the heat source being measured.

An additional object of the present invention is to provide an optical infrared radiation pyrometer which may be calibrated for accuracy over an extremely wide temperature range.

A further object of the present invention is to provide an optical, infrared radiation pyrometer in which an operator may easily focus on a high temperature source being measured and subsequently make a temperature reading without retaining the source in focus.

The above and still further objects, features and advantages of the present invention will become apparent upon consideration of the following detailed description of one specific embodiment thereof, especially when taken in conjunction with the accompanying drawings, wherein:

FIGURE 1 is a side sectional view of a preferred embodiment of the optical infra-red radiation pyrometer of the present invention; and FIGURE 2 is a circuit diagram of the radiation pyrometer of FIGURE 1.

Reference is now made to FIGURE 1 of the drawings wherein the reference numeral 11 denotes a source of heat which is to be measured by optical infra-red radiation pyrometer 12. Infra red rays from source 11 are coupled to detector 23 of pyrometer 12 via objective lens 13, beam splitter 14 and infra-red filter 15. Objective lens 13 is rigidly mounted in sleeve 20 which is translatable within bore 16 of pyrometer casing 12. Flanges 17 and 18 are provided at either end of sleeve 20 in order to always maintain the sleeve within bore 16. Thereby, the possibility of objective lens 13 being removed from the casing is obviated.

Infra-red rays impinging on beam splitter 14, are reflected towards infra-red filter 15. Visible light rays are passed through the beam splitter to optical sighting window 19. Sighting window 19 is fixedly mounted in sleeve 21 which is rigidly secured to the outer casing of the pyrometer 12. Sighting window 19 defines a circular field of view which is propagated through objective lens 13 and beam splitter 14 into waves that are focused on eye piece 22. A small opening in sighting (not shown) window 19 defines the same target area as seen by the detector.

To prevent damage to the eye of the operator making the measurement and to insure coupling of all of the infra-red energy from source 11 to detector 23, beam splitter 14 is provided with a reflective coating for only the infra-red spectrum. Light rays having frequencies greater than those lying in the infra-red spectrum are coupled directly to the observer through beam splitter 14, sighting window 19 and eye piece 22. Since detector 23 and eye piece 22 are at substantially the same optical distance from beam splitter 14, focusing of objective lens 13 by the operator for his eye also focuses the image of source 11 on the detector. Thereby, an accurate indication of the temperature of source 11 is derived by measuring the impedance of heat ray responsive detector 23. Detector 23 is not responsive to the spurious effects of light rays because such rays are blocked by beam splitter 14 and infra-red filter 15. Any problems of parallax between the viewer's eye and the detector are eliminated because the operator is assured of viewing the target in the same manner as the detector.

As the temperature of source 11 and the quantity of infra-red energy emitted thereby increases, the impedance of detector 23 decreases and a measurement of this impedance provides an accurate indication of the source temperature. The impedance of detector 23 is measured by the electronic circuitry of FIGURE 2 located in container 12. It is to be understood that electrical leads, not shown, couple the output terminals of detector 23 to the electronic apparatus in container 12.

A direct reading in temperature is derived from the meter movement 25 mounted on the face of pyrometer casing 12 so that the operator may readily determine the temperature level of source 11. After the operator is satisfied that he has correctly sighted onto source 11 by focusing objective lens 13, he turns handle 26, mounted on the forward end of casing 12. Rotation of handle 26 results in activation of a switching circuit for an electronic memory employed in the circuitry so that the operator can observe the reading on meter 25 even though the instrument is no longer sighted on source 11.

Reference is now made to FIGURE 2 of the drawings which discloses a preferred embodiment of the electronic circuitry situated in container 24, FIGURE 1. The measuring system of the present invention comprises essentially a differential amplifier composed of tetrodes 35 and 36 having control grids responsive to the output voltages of Wheatstone bridge 52. Wheatstone bridge 52 is energized at its diagonals opposite from those connected to the control grids of tubes 35 and 36 by the negative terminal of battery 31 and the positive potential of the slider of potentiometer 38. The voltage at the slider of potentiometer 38 is coupled to the slider of potentiometer 53 which is ultimately calibrated to provide accurate low temperature readings of meter 25. The opposite ends of potentiometer 53 are connected to separate legs 54 and 55 of Wheatstone bridge 52.

Arm 55 includes heat responsive detector 23, a high temperature range calibrating resistor 56 and a low temperature compensating resistor 57 which are selectively connected to the control grid of tube 35 via armature 58 of switch 26. Resistors 56 and 57 are selected to simulate the known impedances of detector 23 at predetermined high and low temperatures.

Each of the other arms of Wheatstone bridge 52 includes a fixed resistance so that the difference in potential applied to the control grids of tubes 35 and 36 is a measure of the difference of impedance between arms 54 and 55. To accurately measure the difference in potential at the control grids of tubes 35 and 36, a low impedance meter, e.g. 0–50 microammeter 25, is connected between their anodes and senses the potential difference across load resistors 33 and 34.

When a measurement is being conducted, switch 26 is positioned at its intermediate point so that the control grids of tubes 35 and 36 are connected to the diagonals of the Wheatstone bridge via switches 58 and 59, respectively. At the same time energizing potential is applied to the anode of tubes 35 and 36 by battery 31 via switch armature 44 and terminal 42 of switch 26, and filament current is applied to the directly heated cathodes via switch armature 49 from battery 32. Simultaneously, switch 48, positioned below meter 25 on pyrometer casing 12, is set at an intermediate position so that detector 23 is connected in the circuit. In response to highly elevated temperatures of source 11, the impedance of detector 23 is a minimum and a significant difference in voltage is developed across the anodes of tetrodes 35 and 36. For smaller temperatures of source 11, the potential difference applied to the differential amplifier and the reading of meter 25 are accordingly decreased since the bridge is more nearly balanced.

After the target has been sighted by the operator and objective lens 13 has properly been focused, the reading is attained by positioning armatures 44 and 49 on the "hold" terminals 43 and 61, respectively. Since armatures 58 and 59 are ganged to armatures 44 and 49, the diagonals of bridge 50 are simultaneously disconnected from the control grids of tubes 35 and 36. The potentials at the control grids are maintained at the same values as they were during a reading, however, because of the connection of storage capacitors 62 and 63 thereto. These capacitors tend to maintain the control grids of tubes 35 and 36 at the same potential that was coupled thereto when switch 26 was in a "read" state, and a reading may be made for observation of meter 25.

To calibrate the pyrometer of the present invention, calibrate switch 48 is initially set to the low temperature position so that armatures 47, 51 and 50 alight on terminals 45, 64 and 65, respectively. At the same time, function switch 26 is set to the "off" position, as illustrated in the circuit diagram, FIGURE 2. These connections result in energization of tubes 35 and 36 and substitute resistor 56 for detector 23 in the Wheatstone bridge circuit. With the slider of potentiometer 38 positioned at the top of the slide wire, the slider of potentiometer 53 is adjusted until a bridge balance and a zero reading on meter 25 are attained. This operation calibrates the pyrometer for low or ambient temperatures since the value of resistance 56 is selected to be equal to the resistance value of detector 23 for such temperatures and the impedance ratio in arms 54 and 55 are equal due to the position of potentiometer 53. The positions of the sliders of potentiometers 38 and 54 are controlled by rotating screws (not shown) mounted on the exterior of casing 12.

To calibrate the system for high temperatures, calibrate switch 48 is adjusted so that armatures 47, 51 and 50 engage terminals 46, 66, and 67, respectively. Thereby, tubes 35 and 36 are energized via batteries 31 and 32 in exactly the same manner as they are energized when calibrate switch 48 is in a "low" position. Resistor 57, however, is connected as one arm of the Wheatstone bridge in this configuration. Resistance 57 has a value equal to that of detector 23 when the latter is subjected to the highest temperature expected from source 11. Thus, with switch 48 in a "high" position, meter 25 should be deflected to full scale reading. To accomplish this, the bridge input voltage is varied until a full scale reading is achieved with switch 48 in a "high" position by adjusting the slider of potentiometer. When it becomes impossible to calibrate meter 25 for the high temperature adjustment, an indication is provided that batteries 31 and 32 must be replaced.

It should now be apparent that there has been herein disclosed a portable, optical pyrometer employing calibrating features in both the high and low temperature ranges wherein the operator is capable of optically sighting onto the source being measured and subsequently obtaining a temperature reading of the source without it being maintained in focus.

While we have described and illustrated one specific embodiment of our invention, it will be clear that variations of the details of construction which are specifically illustrated and described may be resorted to without departing from the true spirit and scope of the invention as defined in the appended claims.

We claim:

1. An infra-red radiation pyrometer comprising detector means responsive to light and heat energy impinging thereon, a viewing system for an operator utilizing the pyrometer, means for focusing light and heat energy from a heat source being tested on the viewing system and detector means, respectively, said last named means including a beam splitter for the light and heat energy, wherein said beam splitter includes means for reflecting only the heat energy to the detector means and is transparent to light energy.

2. The system of claim 1 wherein said focusing means is adjustable.

3. An infra-red radiation pyrometer comprising detector means responsive to light and heat energy impinging thereon, a viewing system for an operator utilizing the pyrometer, means for focusing light and heat energy from a heat source being tested on the viewing system and detector means, respectively, said last named means including a beam splitter for the light and heat energy, wherein said detector means includes means for deriving an indication of the temperature of the source being measured when its energy is focused on the detector means, and means for maintaining said indication substantially constant when the heat energy is no longer focused on the detector means.

4. The system of claim 3 including means for calibrating said detector means for high and low temperature readings.

5. The system of claim 1 including means for calibrating said detector means for high and low temperature readings.

6. An infra-red radiation pyrometer comprising detector means responsive to light and heat energy impinging thereon, a viewing system for an operator utilizing the pyrometer, means for focusing light and heat energy from a heat source being tested on the viewing system and detector means, respectively, said last named means including means for deriving an indication of the temperature of the source being measured when its heat energy is focused on the detector means, and means for maintaining said indication substantially constant when the heat energy is no longer focused on the detector means.

7. The system of claim 6 wherein said means for maintaining includes a storage capacitor.

8. The system of claim 5 wherein said detector means includes a circuit having a variable impedance responsive to heat energy, said calibrating means including a pair of resistors having values for simulating the impedance of said detector in response to high and low temperature sources, respectively, and means for selectively replacing the impedance with said resistors in said circuit.

9. The system of claim 8 wherein said circuit comprises a Wheatstone bridge, and said calibrating means includes means for adjusting the impedance in a pair of the arms of said bridge, and means for controlling the input voltage to said bridge.

10. An infra-red radiation pyrometer comprising detector means responsive to light and heat energy impinging thereon a viewing system for an operator utilizing the pyrometer, means for focusing light and heat energy from a heat source being tested on the viewing system and detector means, respectively, said last named means including a Wheatstone bridge circuit having a variable impedance responsive to light and heat energy, a differential amplifier having its input terminals selectively responsive to the potential difference across the output terminals of said bridge, and a capacitor for storing the potential at one of said output terminals connected to one of said input terminals.

11. The pyrometer of claim 6 further including means for calibrating said detector means for high and low temperature readings, said detector means including a circuit having a variable impedance responsive to heat energy, said calibrating means including a pair of resistors having values for simulating the impedance of said detector in response to high and low temperature sources, respectively, and means for selectively replacing the impedance with said resistors in said circuit.

12. The system of claim 11 wherein said circuit comprises a Wheatstone bridge, and said calibrating means includes means for adjusting the impedance in a pair of the arms of said bridge, and means for controlling the input voltage to said bridge.

References Cited by the Examiner

UNITED STATES PATENTS

| | | | |
|---|---|---|---|
| 2,624,012 | 12/52 | English et al. | 250—218 X |
| 2,938,385 | 5/60 | Mack et al. | 73—362 |
| 2,968,946 | 1/61 | Goldberg et al. | 73—355 |

ISAAC LISANN, *Primary Examiner.*